United States Patent
Pardehpoosh et al.

(10) Patent No.: US 9,319,406 B2
(45) Date of Patent: Apr. 19, 2016

(54) SYSTEM AND METHOD FOR LINKING PRE-INSTALLED SOFTWARE TO A USER ACCOUNT ON AN ONLINE STORE

(75) Inventors: Pedraum R. Pardehpoosh, Palo Alto, CA (US); Craig M. Federighi, Los Altos Hills, CA (US); Daniel I. Feldman, San Francisco, CA (US); Gregory T. Quirk, Maple Glen, PA (US); Jack R. Matthew, San Francisco, CA (US); Jackie Lee-Kang, Sunnyvale, CA (US); Jean-Pierre Ciudad, San Francisco, CA (US); Monika E. Gromek, Oakland, CA (US); Thomas K. Burkholder, Vancouver (CA); Daniel Emil Pu, San Francisco, CA (US); Sam Gharabally, San Francisco, CA (US); Ellis Marshall Verosub, San Carlos, CA (US); Yoon Sub Hwang, Alameda, CA (US)

(73) Assignee: Apple Inc., Cupertino, CA (US)

( * ) Notice: Subject to any disclaimer, the term of this patent is extended or adjusted under 35 U.S.C. 154(b) by 756 days.

(21) Appl. No.: 13/181,424

(22) Filed: Jul. 12, 2011

(65) Prior Publication Data

US 2013/0019233 A1    Jan. 17, 2013

(51) Int. Cl.
*G06F 9/44* (2006.01)
*G06F 9/445* (2006.01)
(Continued)

(52) U.S. Cl.
CPC .......... *H04L 63/0876* (2013.01); *G06F 21/121* (2013.01); *G06F 21/128* (2013.01);
(Continued)

(58) Field of Classification Search
CPC ... G06F 17/30082; G06F 21/31; G06F 21/41; G06F 21/44; G06F 8/61; G06F 8/65
See application file for complete search history.

(56) References Cited

U.S. PATENT DOCUMENTS 7,979,350 B1   7/2011   Carion
8,731,529 B2   5/2014   Lindeman et al.
(Continued)

FOREIGN PATENT DOCUMENTS

EP   1174786 A2   1/2002
EP   2062457 B1   8/2007
(Continued)

OTHER PUBLICATIONS

Haibo Lin et al.; Overcoming Static Register Pressure for Software Pipelining in the Itanium Architecture; 2003 Springer; pp. 109-113; <http://link.springer.com/chapter/10.1007/978-3-540-39425-9_12>.*

(Continued)

*Primary Examiner* — Thuy Dao
*Assistant Examiner* — Cuong V Luu
(74) *Attorney, Agent, or Firm* — Page Ponsford; DLA Piper LLP US

(57) ABSTRACT

Disclosed herein are systems, methods, and non-transitory computer-readable storage media for associating an application that was pre-installed on a computer with a user account on an online store. A system configured to practice the method presents an application available for download, receives a request to download the application to a computing device, determines that the application is a pre-installed application, presents an authorization prompt configured to request user authorization to link the application with a user account, receives the user authorization, generates a unique hardware identifier associated with the computing device, determines that the application is linkable based upon the unique hardware identifier, and links the adoptable application with the user account when the adoptable application is linkable.

28 Claims, 13 Drawing Sheets

(51) Int. Cl.
*H04L 29/06* (2006.01)
*G06F 21/12* (2013.01)
*G06F 21/62* (2013.01)
*H04W 4/00* (2009.01)
*H04W 12/06* (2009.01)
*G06Q 20/36* (2012.01)

(52) U.S. Cl.
CPC ........ *G06F21/6272* (2013.01); *G06Q 20/3672* (2013.01); *H04W 4/003* (2013.01); *H04W 12/06* (2013.01); *G06F 8/61* (2013.01); *G06F 2221/2117* (2013.01)

(56) References Cited

U.S. PATENT DOCUMENTS

| | | | |
|---|---|---|---|
| 2004/0148598 A1* | 7/2004 | Kita | G06F 8/65 717/170 |
| 2004/0162764 A1* | 8/2004 | Kita et al. | 705/26 |
| 2006/0070057 A1* | 3/2006 | Watanabe | G06F 21/57 717/170 |
| 2006/0168574 A1 | 7/2006 | Giannini et al. | |
| 2006/0190808 A1 | 8/2006 | Balthaser | |
| 2008/0037452 A1 | 2/2008 | Tunmer et al. | |
| 2008/0195693 A1 | 8/2008 | Gao et al. | |
| 2008/0222604 A1* | 9/2008 | Murphy | G06F 8/61 717/120 |
| 2009/0055292 A1 | 2/2009 | Chong et al. | |
| 2009/0100149 A1* | 4/2009 | Arnold et al. | 709/219 |
| 2009/0205055 A1 | 8/2009 | Savov | |
| 2009/0307682 A1* | 12/2009 | Gharabally | G06F 8/65 717/172 |
| 2010/0205284 A1 | 8/2010 | Newton et al. | |
| 2010/0211663 A1 | 8/2010 | Barboy et al. | |
| 2010/0306762 A1* | 12/2010 | Lindberg | G06F 8/61 717/176 |
| 2010/0312817 A1 | 12/2010 | Steakley | |
| 2011/0041079 A1 | 2/2011 | Rive et al. | |
| 2011/0066864 A1 | 3/2011 | Tysowski | |
| 2011/0173277 A1 | 7/2011 | Cordani et al. | |
| 2011/0296401 A1* | 12/2011 | DePoy | G06F 8/60 717/174 |
| 2013/0042225 A1* | 2/2013 | Wu | G06F 9/44521 717/165 |
| 2013/0132941 A1* | 5/2013 | Lindeman | H04W 4/001 717/176 |
| 2013/0139230 A1* | 5/2013 | Koh et al. | 726/5 |

FOREIGN PATENT DOCUMENTS

| | | |
|---|---|---|
| WO | 9915947 | 4/1999 |
| WO | 2010/002490 A2 | 1/2010 |
| WO | 2010006914 A1 | 1/2010 |
| WO | 2011001384 A2 | 1/2011 |

OTHER PUBLICATIONS

Junrong Shen et al.; Towards a Unified Formal Model for Supporting Mechanisms of Dynamic Component Update; 2005 ACM; pp. 80-89; <http://dl.acm.org/citation.cfm?id=1081720&CFID=565833482&CFTOKEN=26668334>.*

Milan Vojnovic et al.; On the Effectiveness of Automatic Patching; 2005 ACM; pp. 41-50; <http://dl.acm.org/citation.cfm?id=1103634&CFID=565833482&CFTOKEN=26668334>.*

Phillip G. Armour; The Business of Software an Updated Software Almanac; 2015 ACM; pp. 32-34; <http://dl.acm.org/citation.cfm?id=2770896&CFID=565833482&CFTOKEN=26668334>.*

Christopher M. Hayden et al.; Efficient Systematic Testing for Dynamically Updatable Software; 2009 ACM; 5 pages; <http://dl.acm.org/citation.cfm?id=1656449&CFID=565833482&CFTOKEN=26668334>.*

Michael Wahler et al.; Dynamic Software Updates for Real-Time Systems; 2009 ACM; 6 pages; <http://dl.acm.org/citation.cfm?id=1656440&CFID=565833482&CFTOKEN=26668334>.*

Greg Gunston, "Upgrading Pre-Installed Software," Blog Post at: http://lists.apple.com/archives/installer-dev/2006/Mar/msg00018.html, Mar. 7, 2006 (retrieved on Aug. 9, 2011).

* cited by examiner

You Have 3 Apps to Accept

To receive future updates, the bundled applications iPhoto, iMovie, and GarageBand will be assigned to your Apple ID. A unique hardware identifier from your computer must be sent to Apple to verify eligibility. [ACCEPT]

- iPhoto — Apple Inc.
- iMovie — Apple Inc.
- GarageBand — Apple Inc.

Purchases | Purchase Date
---|---
Angry Birds Rio — Rovio Mobile Ltd. | May 6, 2011 [INSTALLED]
Keynote — Apple Inc. | May 6, 2011 [INSTALLED]
Pages — Apple Inc. | May 6, 2011 [INSTALLED]
Transmit — Panic, Inc. | May 6, 2011 [INSTALLED]

Copyright © 2011 Apple Inc. All rights reserved. Privacy Policy | Terms and Conditions | FAQ

SYSTEM AND METHOD FOR LINKING PRE-INSTALLED SOFTWARE TO A USER ACCOUNT ON AN ONLINE STORE

BACKGROUND

1. Technical Field

The present disclosure relates generally to the distribution of digital products and more specifically to techniques for linking software applications that are pre-installed on an electronic device to a user account on an online store.

2. Introduction

Manufacturers of electronic devices commonly offer customers a variety of available options to personalize and customize an electronic device prior to purchase. For instance, a personal computing device such as a computer can be customized by selecting the processor, memory, hard drive, or accessories. Manufacturers also cooperate with various software vendors to offer software applications or programs that can be purchased along with the computer and pre-installed before the customer takes delivery of the computer. Some software applications, which typically are created by the manufacturer but can also include third-party applications, can be pre-installed on the computing device free of charge either manually or as part of a default factory image, for example. Therefore, the hardware components and the pre-installed software can be personalized by a customer to ensure that the purchased product meets the customer's needs.

After the customer receives the electronic device, the customer may sometime in the future desire to reinstall or update the pre-installed software. For example, a software provider may have released an updated version of the software pre-installed on the electronic device. This is commonly known as a software update. To obtain the software update, the customer visits a physical or online store of the software provider and purchases or acquires the updated version of the software. However, this process is time consuming and sometimes confusing. Similarly, when a purchaser reformats the storage of the electronic device, the purchaser must typically reinstall the software. During reinstallation, the purchaser may be prompted for various compact discs (CDs) or other media containing the pre-installed software. However, the purchaser may have misplaced the CDs, thus making the reinstallation procedure quite cumbersome.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for associating a pre-installed application with a user account on an online store. This process can be called adoption. In one common scenario, a new computer includes certain pre-installed software. A user can run and use the pre-installed software on the new computer. However, in order to receive and/or be eligible for updates, backups, and/or other software-related content or services, the user can 'adopt' the pre-installed software. By adopting the pre-installed software, the pre-installed software is associated with a particular user account, such as an online electronic store account. Then the online electronic store can handle updates, backups, restores, in-application purchases, and so forth. However, a user can opt to use the pre-installed software without 'adopting' the pre-installed software with full functionality except for features relying on a user account or access to the online electronic store account. When a user adopts pre-installed software, the online electronic store can modify the account, a database, and/or the software itself so that the pre-installed software is ineligible for being re-adopted by another user.

A system configured to practice the method presents an application available for download, receives a request to download the application to a computing device, and determines that the application is a pre-installed application. Then the system presents an authorization prompt configured to request user authorization to link the application with a user account, receives the user authorization, and, in response to receiving the user authorization, generates a unique hardware identifier associated with the computing device. The system determines that the application is linkable based upon the unique hardware identifier, and links the adoptable application with the user account when the adoptable application is linkable. The system can present the application available for download by receiving a request for an updates page, and, in response to receiving the request, collecting a stub receipt associated with the application. The stub receipt can include a version number and a name associated with the application. Then the system determines, based upon the version number and the name, that an update of the application is available on a server for download, and presents the name of the application.

Alternatively, the system can present the application available for download by receiving a request for a purchases page, receiving a manifest associated with the computing device, and presenting the list of pre-installed applications. The manifest can include a list of pre-installed applications available for download from a server, and the list of pre-installed applications can include the application. The system can determine that the application has an update available on a server by searching an applications database for the application and comparing the version number of the application with a second version number of a second application stored on the applications database, wherein the second application is the update of the application. The system can determine that the application is a pre-installed application by determining that the application is associated with a stub receipt. The system can determine that the application is a pre-installed application by receiving a manifest associated with the computing device, the manifest including a list of pre-installed applications, and determining that the application is included within the list of pre-installed applications. The system can determine that the pre-installed application is linkable by transmitting the unique hardware identifier to a server, and determining whether the pre-installed application has been linked with another user account. In yet other examples, the system links the pre-installed application with the user account by associating the pre-installed application with the user account, and updating a uniqueness table to include the unique hardware identifier. The uniqueness table can include another unique hardware identifier that is associated with another electronic device having another pre-installed application, and the another pre-installed application can be linked with another user account.

In another variation, the system receives a request to link a pre-installed application with a user account on an online store, the online store configured to transmit applications associated with the user account to one or more computing devices associated with the user account. Then the system generates a unique hardware identifier associated with a computing device, and determines that the pre-installed application is linkable based upon the unique hardware identifier. The system links the pre-installed application with the user account when the pre-installed application is linkable. The unique hardware identifier can be based upon one or more hardware components of the electronic device, such as a MAC address, universal device identifier (UDID), a logic board serial number, or an Ethernet hardware address. Determining that the pre-installed application is linkable can include transmitting the unique hardware identifier to a server, and determining whether the pre-installed application has been linked with another user account. The system can determine that the pre-installed application is linkable by determining that an original configuration of the computing device includes the pre-installed application. Linking the pre-installed application with the user account can include associating the pre-installed application with the user account, updating a uniqueness table to include the unique hardware identifier, the uniqueness table including another unique hardware identifier that is associated with another electronic device having another pre-installed application, the another pre-installed application having been linked with another user account. In yet another example, linking the pre-installed application with the user account further includes removing metadata associated with the pre-installed application from a manifest, the manifest being configured to list pre-installed applications that have yet to be linked with the user account. The system can download the pre-installed application to the computing device.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 6 illustrates an example of an HTML page requesting user authorization to adopt pre-installed applications;

FIG. 9 illustrates an example of an HTML page associated with a purchases page request when the user is not signed in;

FIG. 10 illustrates another example of an HTML page associated with a purchases page request when the user is signed in;

FIG. 15 illustrates an exemplary process for recovery mode on an electronic device.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Figure 1:
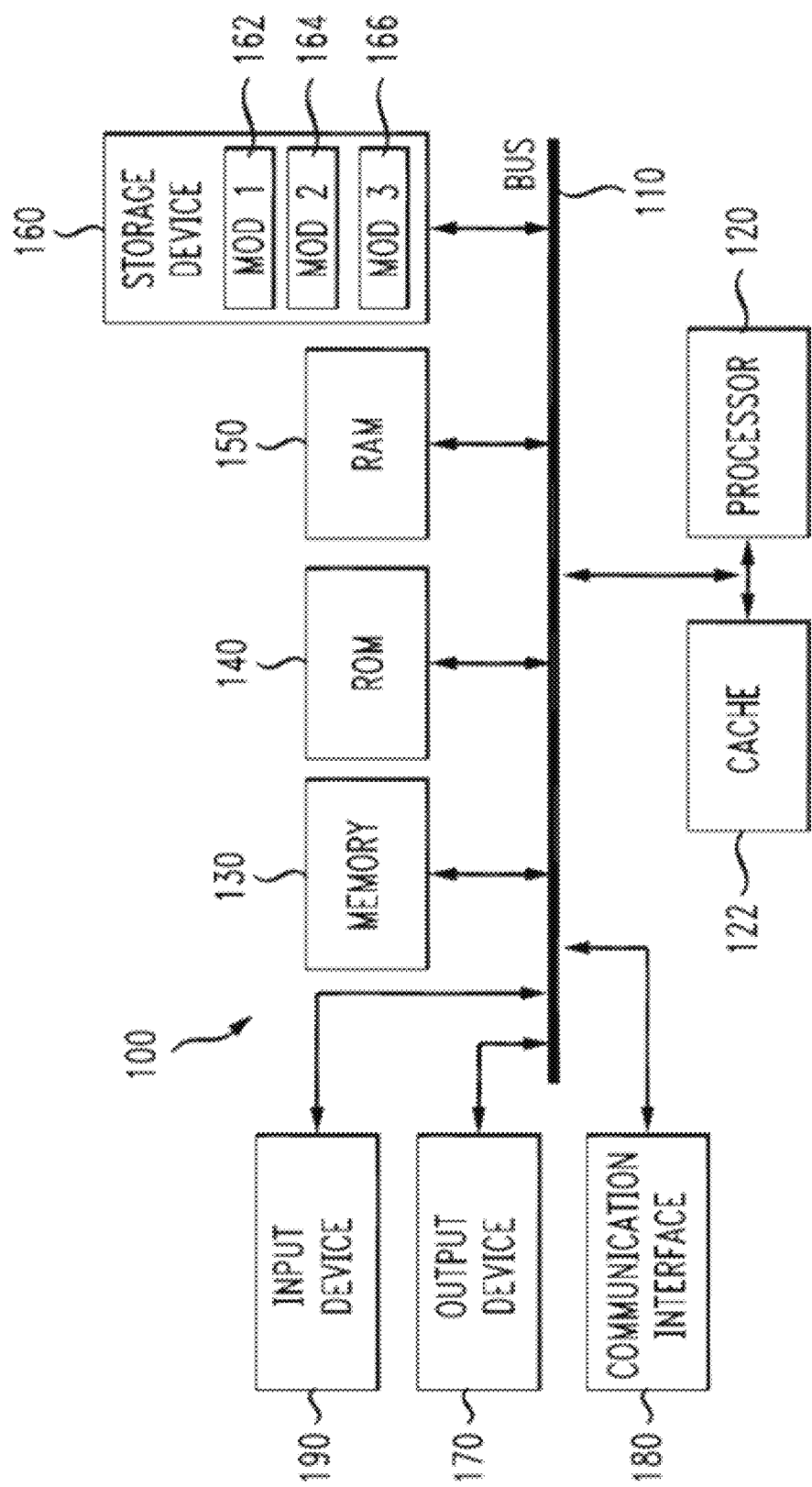
FIG. 1 illustrates an exemplary system embodiment.

The present disclosure addresses the need in the art for associating pre-installed software on an electronic device to a user account on a distribution center or online store. By associating pre-installed software with a user account on an online store, software updates and reinstallations can be downloaded from an online store, thus proving an easier, more convenient way of managing software on an electronic device. A brief introductory description of a basic general purpose system or computing device, which can be employed to practice the concepts is illustrated in FIG. 1. A more detailed description of how the pre-installed software is associated with a user account will follow, including several variations as the various embodiments are set forth. The disclosure now turns to FIG. 1.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache 122 of high speed memory connected directly with, in close proximity to, or integrated as part of the processor 120. The system 100 copies data from the memory 130 and/or the storage device 160 to the cache 122 for quick access by the processor 120. In this way, the cache provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

Having disclosed some components of a computing system, the disclosure now returns to a discussion of techniques for associating (which is analogous to linking or adopting) pre-installed software on a computing device such as a personal computer, laptop, game console, smart phone, mobile phone, or tablet PC to a user account in an online application distribution store or market. The approaches set forth herein can improve the efficiency and convenience of upgrading or reinstalling pre-installed software onto a computing device by linking the pre-installed software to a user account on an online distribution site such as an online store or distribution center. The online distribution site transmits the pre-installed software associated with a user account to one or more computing devices that are linked to the user account. The pre-installed software and updates to the pre-installed software can both be transmitted to the one or more computing devices. In some examples, the distribution site can specify a limit to number of computing devices associated with a given user account that can receive software associated with the given user account.

Figure 2:
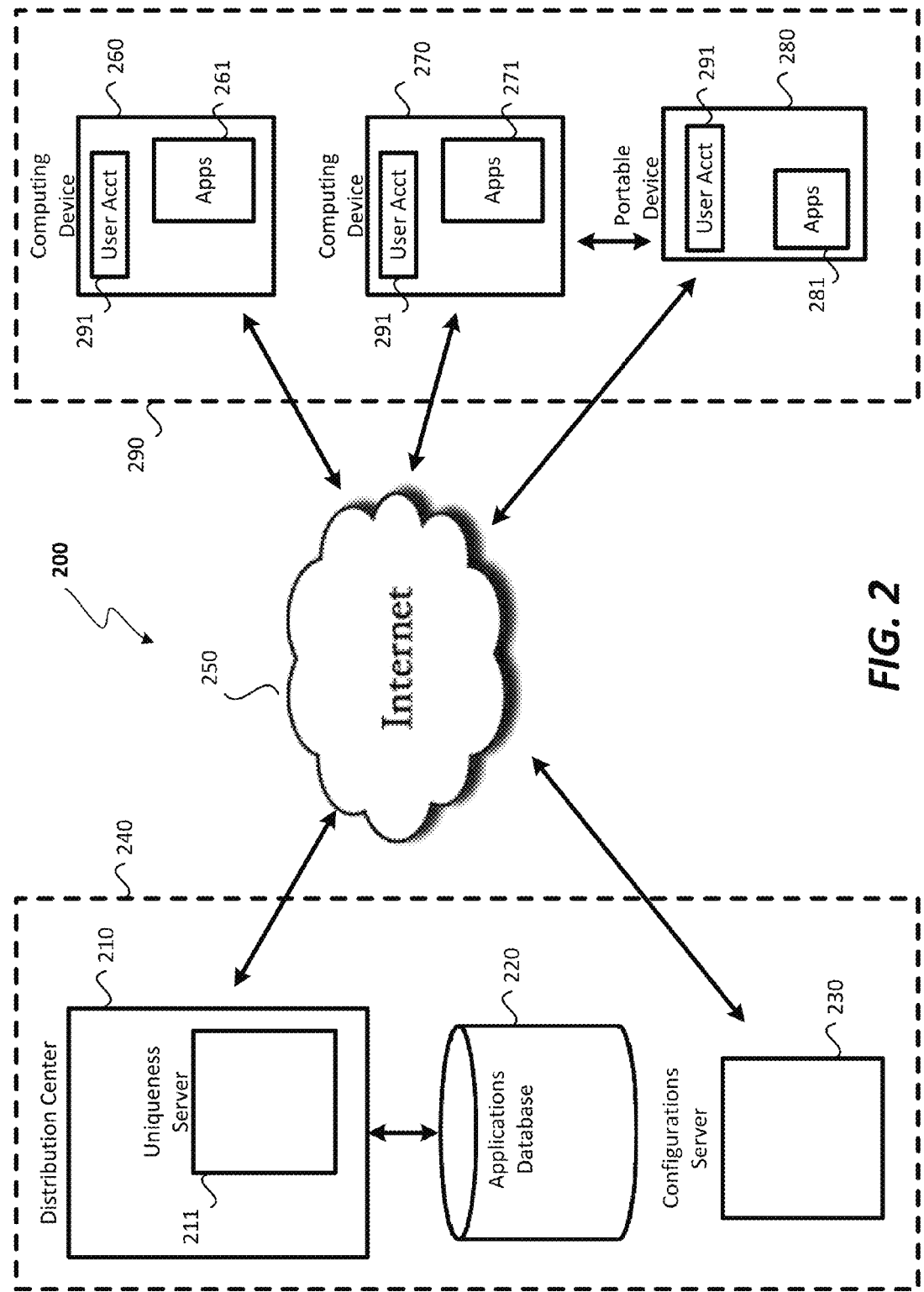
FIG. 2 illustrates an exemplary application distribution system.

FIG. 2 illustrates an exemplary application distribution system. In this example, distribution system 200 includes distribution center 210, applications database 220, configurations server 230, the Internet 250, computing device 260, computing device 270 and portable device 280. Together, distribution center 210, applications database 220, and configurations server 230 can represent server side 240 of a client-server model. Similarly, computing device 260, computing device 270, and portable device 280 can represent client side 290 of the client-server model. Thus, the broad overview of distribution system 200 includes server side 240 communicating with client side 290 via the Internet 250. As an example, the server side 240 can be represented to the user as an online store for the sale and distribution of applications. A device from client side 290 can communicate with the online store using an application management computer program stored on the device. In other examples, the Internet 250 can be replaced with other communication networks such as computer networks, telephone networks, Ethernet, local area networks, wired networks, wireless networks, and others.

Computing device 260 includes applications 261. Applications 261 can include applications that were pre-installed on computing device 260, or simply pre-installed applications. In other words, computing device 260 was purchased with these applications already installed by the manufacturer of computing device 260. Applications 261 can also include applications that were purchased from distribution center 210 by a user of computing device 260. To purchase desired applications from distribution center 210, a user logs into user account 291, which contains metadata associated with applications that the user has already purchased and metadata associated with payment information for making payments to distribution center 210 in exchange for the desired applications. Once logged in, the user may select a desired application to purchase. When the user agrees to pay the price of the application, the user's payment information is used to complete the transaction. Once the transaction is completed, the desired application is associated with user account 291, thus allowing the user to download the desired application and also updates of the desired application. Applications associated with user account 291 can also be updated or re-downloaded onto other devices that are associated with user account 291. In this example, computing device 260, computing device 270, and portable device 280 are all associated with user account 291 and thus, are configured to receive updates and re-downloads of all applications that have been associated with user account 291. Moreover, portable device 280 can communicate with computing device 270 to transfer digital data and applications between the two devices. In one example, computing device 280 may be configured to be a central repository containing all applications associated with user account 291 that transfers selected applications to portable device 280. In this specification, the term "application" refers to a copy of a software program or application provided by a software provider. In other examples, other digital products besides software applications and software programs (such as system software, enterprise software, multimedia files, video files, audio files, and image files) that were initially pre-installed on a computing device can also be associated with user account 291 and distributed/re-distributed by distribution center 210.

Distribution center 210, which is coupled to applications database 220, is configured to sell, deliver, and maintain applications from applications database 220. Applications database 220 can be configured to store some or all of the applications available for distribution from server side 240. The applications can be sold, updated, and delivered (i.e., transmitted) to a device in client side 290 through the Internet 250. As such, distribution center 210 represents an online store for applications. For example, applications database 220 can receive a request from distribution center 210 for an application and in response to the request, transmits the requested application to distribution center 210, which subsequently transmits the application to the requesting device. The applications requested may be applications available for purchase or applications previously associated with a user account (i.e., previously purchased or pre-installed applications that have been adopted). In other examples, applications database 220 can directly transmit the requested application to the requesting device.

A device of client side 290 can transmit a request to link (i.e., associate or adopt) a pre-installed application on the device with a user account. Linking an application allows the user to associate the application with a user account, thus allowing the user to download the application to other devices also associated with the same user account. This process can be called "linking", "adopting", or "associating". For example, client 260 can request to link a pre-installed application from applications 261 with user account 291. The request is transmitted along with a unique hardware identifier of client 260 to distribution center 210 via the Internet 250 to determine whether the pre-installed application can be associated with user account 291. A unique hardware identifier is a unique identifier based upon hardware of the device that is used to distinguish a particular device from all other devices. For example, a manufacturer can ensure that each device manufactured includes a unique hardware identifier that is unique and thus different than the unique hardware identifier of any other device. As an example, a unique hardware identifier can be based upon the logic board serial number and/or the Ethernet hardware address of the device. In one example, these two values can be concatenated and hashed to generate the unique hardware identifier. In other examples, other metadata specific to the device may be concatenated, hashed, or otherwise combined using a variety of data manipulation algorithms the form the unique hardware identifier.

The distribution center 210 receives the unique hardware identifier, and processes or analyzes the unique hardware identifier to determine whether the pre-installed application can be associated with a user account. In certain scenarios, a pre-installed application cannot be associated with a user account. For example, a pre-installed application of a device may not be associated with a user account if the pre-installed application has previously been associated with another user account. As another example, a pre-installed application may not be able to be associated with a user account if the pre-installed application is not an authorized copy. This may occur when a user copies an application that was pre-installed on one device onto another device. As yet another example, a pre-installed application on an electronic device can only be linked to a user account when the user is logged into that electronic device.

Server side 240 may incorporate a number of servers and tables to determine whether the link request should be authorized. For example, distribution center 210 includes uniqueness server 211 which is configured to process the unique hardware identifier to determine the validity or legitimacy of a link request. Uniqueness server 211 can include a uniqueness table configured to maintain a database or table of electronic devices that have had one or more pre-installed applications linked with a user account. As an example, the uniqueness table can be configured to store the unique hardware identifier of devices that have already linked its pre-installed applications with a user account (i.e., devices that have already adopted the pre-installed applications associated with the device). The uniqueness table can also be configured to store metadata associated with the pre-installed applications that have been associated with a user account. When a device adopts (i.e. links) some or all of its pre-installed applications with a user account, the device's unique hardware identifier is stored within the uniqueness table. This prevents future requests to link the pre-installed software on the device from being authorized since these requests are invalid. Thus, performing a query on whether a unique hardware identifier is in the uniqueness table determines if the device associated with the unique hardware identifier has already linked its pre-installed applications with a user account. If so, the current request should be rejected. An another example, the uniqueness table can be configured to store the unique hardware identifier of an electronic device along with metadata associated with one or more pre-installed applications of the electronic device that has been previously adopted (i.e., linked with a user account). In other words, the uniqueness table is configured as a one-to-many mapping between a unique hardware identifier of a device and one or more pieces of metadata associated with pre-installed applications of the device that have been selectively adopted. Querying the uniqueness table for a unique hardware identifier will return nothing if the unique hardware identifier does not exist in the uniqueness table and return metadata associated with pre-installed applications that have been selectively adopted if the unique hardware identifier does exist in the uniqueness table. This can result in the ability to selectively adopt a pre-installed application on a device with a first user account and another pre-installed application on the device with a second user account.

Configurations server 230 can also verify the validity of the link request by checking the original configuration of the electronic device to verify or determine that a specific application was pre-installed on the electronic device when the device left the manufacturer. Configurations server 230 includes a database that stores the original configuration of electronic devices created by the manufacturer. The original configuration can include the version of the operating system and the version of the applications, if any, that were delivered with the electronic device. When configurations server 230 receives a look up request containing a unique hardware identifier generated from an electronic device, configurations server 230 performs a search or query on the database and returns the version of the operating system installed on the device and a list containing the version of applications that were pre-installed on the electronic device. Configurations server 230 can compare the list of pre-installed applications with the application the user is attempting to associate with the user account to determine whether the application the user is attempting to associate was actually pre-installed on the electronic device. Alternatively, configurations server 230 can pass the list of pre-installed applications to distribution center 210 to determine whether the link request should be granted. This check can prevent users from attempting to circumvent distribution system 200 by copying pre-installed applications from one device to another.

Once one or more elements of server side 240 validate the link request, the pre-installed application is associated with the user account (i.e., application adoption). Moreover, uniqueness server 211 or configurations server 230 can be updated to take into account the application adoption. For example, a new entry can be added into the uniqueness table of uniqueness server 211 since the some or all of the pre-installed applications associated with the electronic device have been adopted. In some examples, distribution center 210 can transmit an update of the pre-installed application to computing device 260 after the pre-installed application is associated with the user account. In other examples, distribution center 210 can transmit the pre-installed application to other devices associated with the user account, such as computing device 270, even though computing device 270 was not originally configured with the pre-installed application. Through similar requests for application adoption, pre-installed applications of computing device 270 stored in applications 271 and pre-installed applications of portable device 280 stored in applications 281 can be associated with user account 291 and ultimately distributed to computing device 260, computing device 270, and portable device 280.

Figure 3:
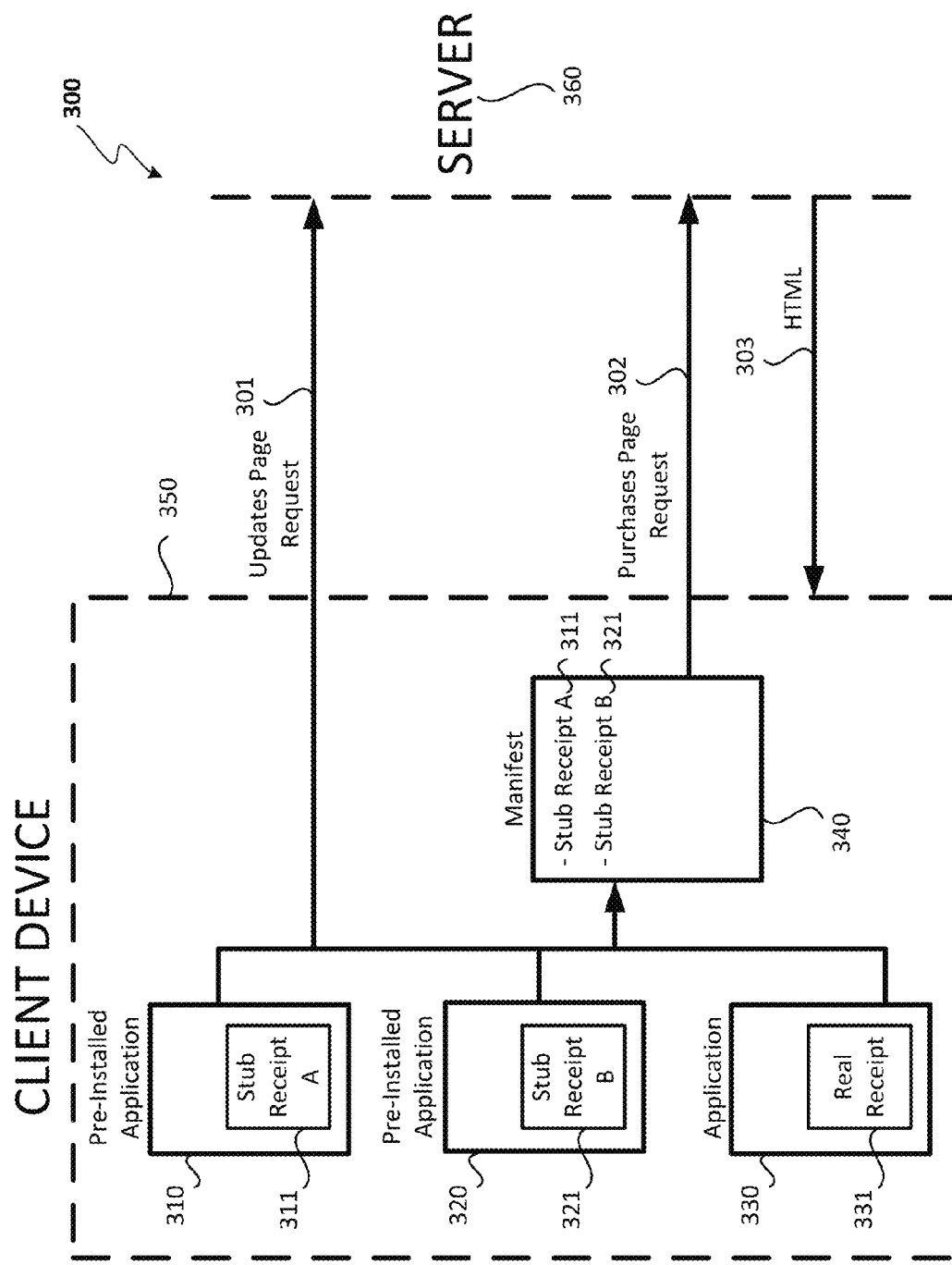
FIG. 3 illustrates an exemplary client-server system.

FIG. 3 illustrates an exemplary client-server system. Client-server system 300 includes client device 350 and server 360. Server 360 can be configured to respond to requests from client device 350 and can include one or more elements from server side 240 of FIG. 2. Client device 350 can associate pre-installed applications with a user account by submitting one of two types of page requests to server 360.

The first type of page request is updates page request 301. Updates page request 301 can be a request transmitted to server 360 to perform a query for available application updates. In response to updates page request 301, server 360 can return HyperText Markup Language ("HTML") page 303 configured to inform the user of applications stored in client device 350 that have an update available. In other examples, server 360 can return metadata to client device 350, which in turn generates the HTML page to present to the user. Updates page request 301 can include a receipt for each application stored in client device 350. The receipt is a document that contains metadata related to the application. One type of receipt is a real receipt, which are associated with purchased applications or applications that have been adopted. The real receipt can include a description of the application, the version number of the application, when the application was purchased, information relating to who purchased the application, information relating to the device that the application was initially installed on, and others. In other words, the real receipt is a proof of purchase that is unique to the purchaser and/or the electronic device that the application was purchased on. Another type of receipt is a stub receipt. Stub receipts are generated by the manufacturer as receipts to be associated with pre-installed applications. In order to expedite and simplify the installation of applications by the manufacturer, the stub receipts can include a minimal amount of information which is less than in real receipts. For example, the stub receipts can include an application identifier that identifies the application to the server and also a version number that identifies the version of the application. The application identifier can be a name associated with the application. The stub receipt may not include information specific to the purchaser such as when the application was purchased and information relating to who purchased the application or what device the pre-installed application was installed on. In other words, the stub receipt may not contain user accounts, user account information, or information relating to the client device, computing device, or other device. The application identifier can be a name associated with the pre-installed application. In some examples, stub receipts are generated by the manufacturer when the applications are being pre-installed on the device or the device is being prepared for delivery. In other examples, the stub receipts can be generated by server 260 and subsequently transmitted to client device 350 to be associated with a pre-installed application. Server 360 can generate the stub receipts in response to a request by client device 350 or periodically scheduled communications between server 360 and client device 350. Once a pre-installed application is adopted, the stub receipt can be replaced with a real receipt.

In this example, updates page request 301 includes stub receipt A 311 associated with pre-installed application 310, stub receipt B 321 associated with pre-installed application 320, and real receipt 331 associated with application 330. Application 330 was purchased from server 360 after the purchase of client device 350 and thus includes a real receipt. In response to updates page request 301, server 360 generates HTML 303 that informs the user if pre-installed application 310, pre-installed application 320, or application 330 have an update available that can be downloaded from server 360. An available update associated with a pre-installed application that has not been adopted (i.e., linked or associated with a user account) cannot be downloaded until the pre-installed application has been adopted to the user account. Once the available update is downloaded and installed on client device 350, the stub receipt can be replaced with an real receipt that includes other metadata such as when the application was purchased (i.e., date that the available update was installed), the user that purchased it, and the electronic device that the application was initially installed on.

The second type of page request is purchases page request 302. Purchases page request 302 can be transmitted to server 360 to request a list of applications that have been purchased by client device 350. In response to the request, Server 360 can return HTML page 303 configured to inform the user of applications that have been purchased by the user of client device 350 and optionally the applications that have been installed in client device 350. Purchased applications not stored in client device 350 can be downloaded and installed. HTML page 303 can also include pre-installed applications that are available for adoption (i.e., linking or associating with a user account). If the pre-installed software is still stored on the client device (i.e., it has not been deleted during recover), a user can select to adopt pre-installed applications through updates page request 301 or alternatively purchases page request 302.

Purchases page request 302 can include manifest 340. Manifest 340 can be configured to store information associated with pre-installed applications. This information can be used by server 360 to inform the user of pre-installed applications that are available for adoption. Manifest 340 includes a list, table, or other data structure configured to store the version number of pre-installed applications in client device 350. The version number of the pre-installed application can be found in a stub receipt or other metadata associated with the pre-installed application. In one example, manifest 340 is generated the first time client device 350 starts up. For example, the manifest can be generated during the first boot of a client device by utilizing a spotlight (i.e., search) function on the client device to search the computer for stub receipts, which are subsequently used to generate the manifest. The manifest can be stored in a configurations server to be accessed during linking of a preinstalled application with a user account or during recovery mode of the electronic device as will be discussed below.

In this example, client device 350 is queried to locate stub receipt 311 and stub receipt 321, which are subsequently used to generate manifest 340. During reformat or recovery of client device 350, both pre-installed and purchased applications can be deleted from the client device 350. Applications that have been linked with a user account can be re-downloaded to client device 350. However, pre-installed applications that have not been linked with a user account risk being lost completely. Manifest 340 serves as a mechanism to prevent loss of pre-installed applications that have not been adopted as will be described in further detail below. A pre-installed application available for adoption cannot be downloaded until the pre-installed application has been linked or associated with the user account. Once the available update is downloaded and installed on client device 350, manifest 340 can be edited to remove the stub receipt associated with the presently adopted application. Furthermore, the installed application contains a real receipt. In some examples, the generation of updates page request 301 and purchases page request 302 along with the processing and retrieval of HTML page 303 are managed and handled by an application management program (not shown) installed in client device 350. The application management program can be proprietary to the manufacturer and be configured to specifically communicate with servers belonging to the manufacturer.

Figure 4:
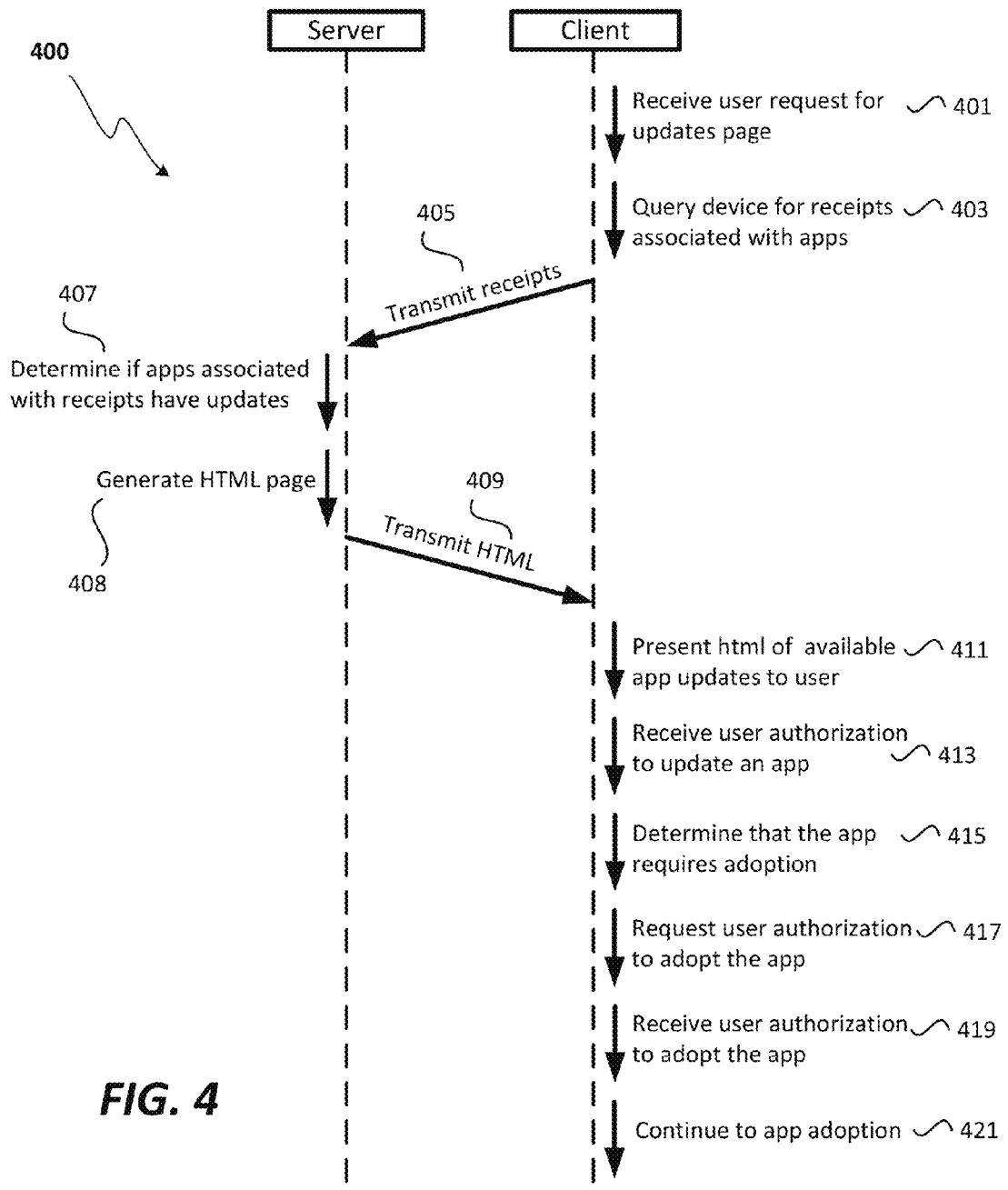
FIG. 4 illustrates an exemplary method for processing an updates page request.

FIG. 4 illustrates an exemplary method for processing an updates page request. Method 400, which illustrates actions performed by a client and a server, can be configured to manage the communications between the client and the server during an updates page request. The actions performed by the server can be executed by a distribution program stored on the distribution center or other component located on the server side while the actions performed by the client can be executed by an applications management program stored on an electronic device of the client. Method 400 can begin with a user selecting an updates tab link in a graphics user interface supplied by a client device. An exemplary updates tab link can be link 451 in FIG. 5. Once the client has received a user request for the updates page (401), the client queries or searches the client device for receipts associated with applications installed in the client device (403). The search may be performed using functionality associated with the operating system of the client device or alternatively an application or routine stored on the client device. The receipts that are found or a copy of the receipts are transmitted to the server (405). The receipts can be transferred across any communication network such as Ethernet, internet, local area networks, and others. The server receives the receipts and processes them to determine if the applications associated with the receipts have updates (407). This can include accessing an applications database such as applications database 220 in FIG. 2 and comparing the version number of the receipt with the version number of the application stored in the applications database. A list of applications with updates can be used in generating an HTML page (408). The HTML page can include information related to applications with available updates. This information can include the original purchase date of the application, a description of the application, and a description of the changes or modification in the updated application. The server can then transmit the HTML page to the client (409). In some examples, the server can transmit the HTML page over the same channel that the client transmitted the receipts.

Figure 5:
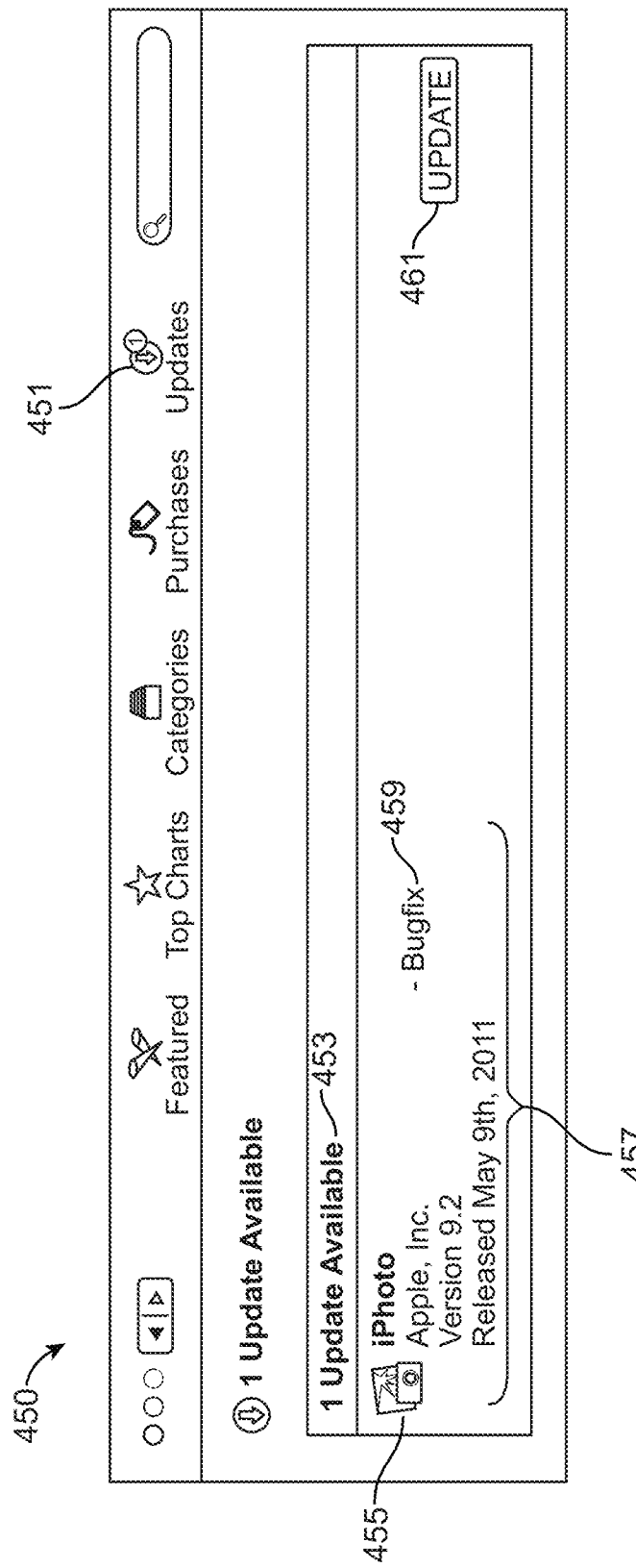
FIG. 5 illustrates an example of an HTML page associated with an updates page request.

FIG. 5 illustrates an example of an HTML page associated with an updates page request. HTML page 450 includes an updates link 451 that can be selected by a user to request the updates page. Updates link 451 can be located on a menu bar with other links such as "featured," "top charts," "categories," and "purchases" to provide a convenient and quick method for the user to access different features of the application management program. In some examples, the icon representing updates link 451 can include a number specifying the number of applications stored in the client device that have an available update. The number in the icon can be generated prior to the user selecting updates tab link 451 through periodic communication between the server and the client device. For example, the client device can periodically communicate with the server and retrieve the most up to date version number of stored applications that have an update available. In this example, updates link 451 has been selected and one application that includes an available update is presented within HTML page 450. The one application is presented with an application description 457 describing the application. Application description 457 can include the name of the application, the author of the application, the version number of the application, the release date of the application, or other information associated with the application. Application description 457 can further include icon 455 that provides an identity to the application and synopsis 459 of the changes that were implemented in this updated version of the application. This can provide information to the user so that the use can make an informed decision on whether he or she wishes to upgrade. HTML page 450 also includes selectable link 461 that can be selected by the user if he or she wishes to receive the application update. The number of available updates is displayed at headline 453. Headline 453 is configured to provide another convenient location where the use can quickly determine the number of updates that are available. In some example, HTML page 450 can also include a selectable link next to headline 453 for updating all applications that have an update available.

Returning to FIG. 4, the client receives the transmitted HTML page and presents the HTML page to the user (411). As discussed in FIG. 5, the HTML page presents a graphical user interface that lists the applications with available updates, a description of the applications, and one or more links selectable by the user to authorize the update of the application. The client can receive user authorization to update an application (413). If user authorization has been received, the client can determine if the application requires adoption before the application can be updated (415). This can include checking the receipt of the application installed on the client to determine whether the receipt is a stub receipt. If the receipt is a stub receipt, then the application associated with the stub receipt is a pre-installed application that potentially has not yet been adopted to a user account. Therefore, user authorization is required and the client can present a HTML page to the user requesting user authorization to adopt or associate the application to the user account (417). User authorization can involve the transmission of personal information across the communication network. For privacy reasons, the HTML page informs the user that personal information will be sent during the authorization process and requests permission to transmit this personal information across the communication network.

Figure 6:
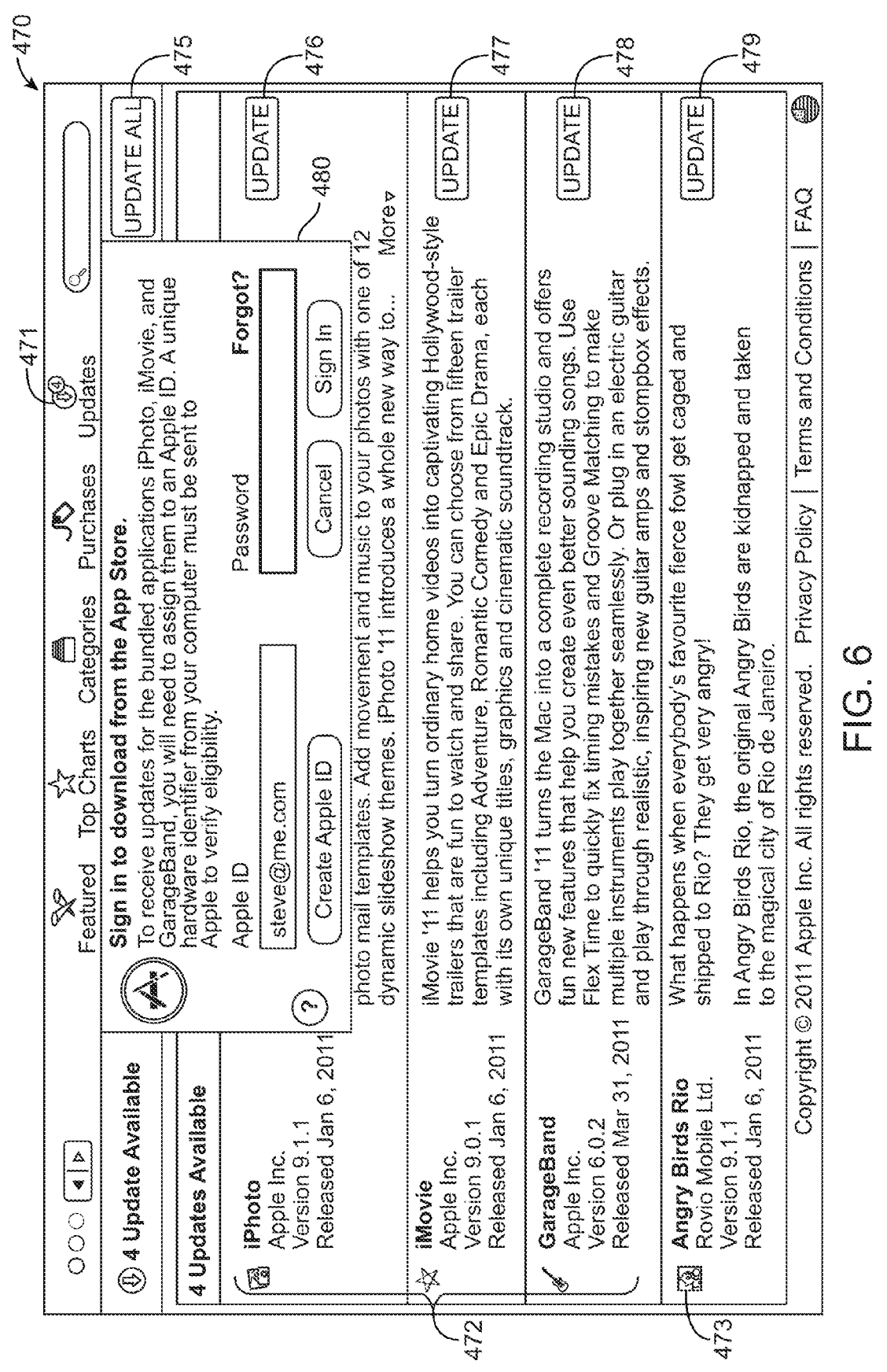

FIG. 6 illustrates an example of an HTML page requesting user authorization to adopt pre-installed applications. HTML page 470 is an updates page that presents four applications with available updates to the user. As such, the icon of updates link 471 incorporates the number "4." In this example, the user has selected to update all of the applications via "update all" link 475. However in other examples, the user can also select to update a single application by selecting one of update links 476, 477, 478, or 479. The applications with available updates include pre-installed applications 472 and purchased application 473. In some examples, there is no differentiation in presentation of pre-installed applications and purchased applications at this stage. However once the user selects to update an application that was pre-installed, HTML page 470 can present prompt 480 to the user. Prompt 480 is described in more detail in FIG. 7.

Figure 7:
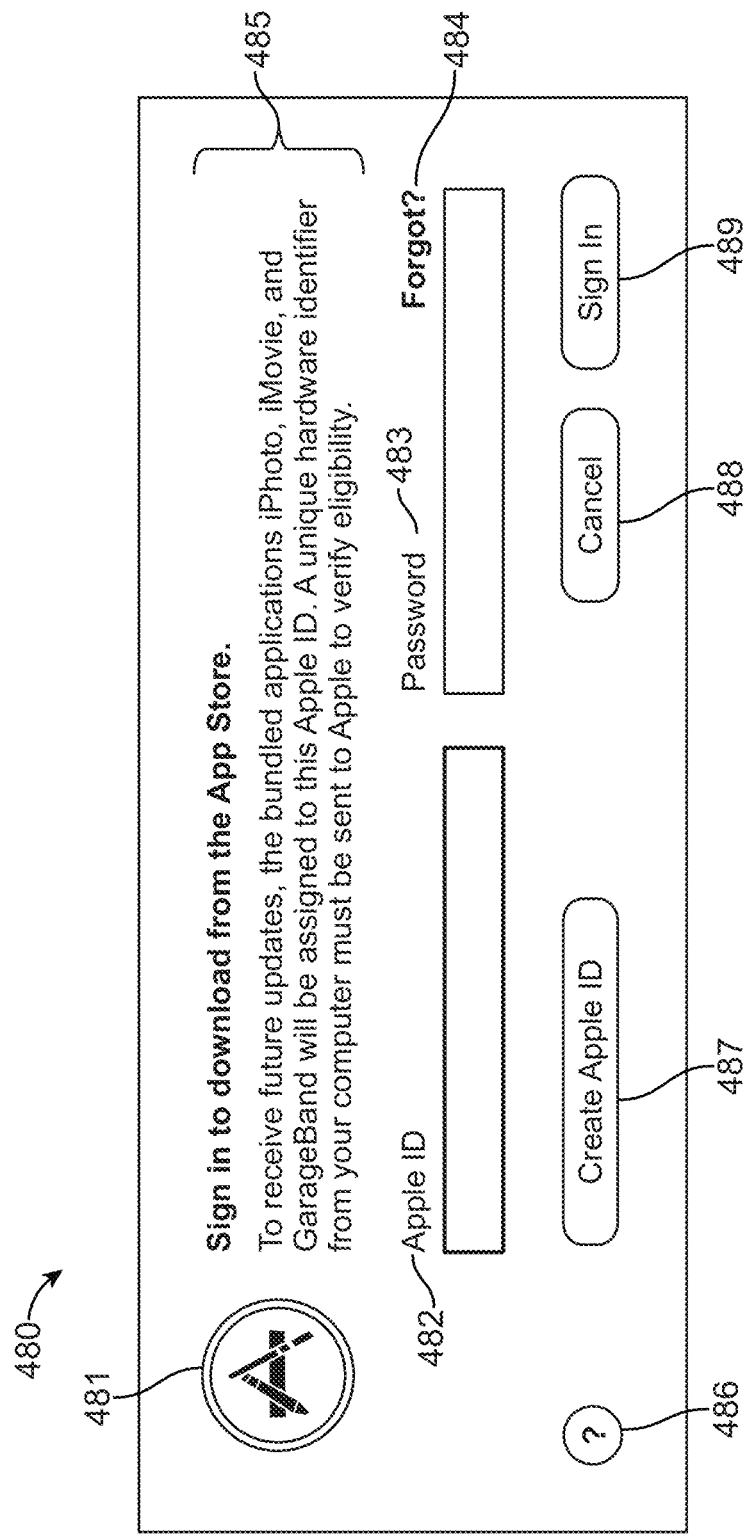
FIG. 7 illustrates another example of an HTML page requesting user authorization to adopt pre-installed applications.

FIG. 7 illustrates another example of an HTML page requesting user authorization to adopt pre-installed applications. Prompt 480, also known as an authorization prompt, is presented to the user when the user selects to update an application that was pre-installed on the computer and possibly has not been associated with a user account. In this example, prompt 480 includes icon 481, login 482, password 483, password assistance 484, description 485, help link 486, account creation 487, cancel 488, and sign in 489. Description 485 provides textual information to inform the user that the applications pre-installed on this electronic device are going to be associated with a user account if the user desires to update the applications. Description 485 can also inform the user that to adopt the applications, a unique hardware identifier associated with the electronic device will be sent to the server to determine if the application adoption should be authorized. Icon 481 can be used to brand the application update function of the application management program. Login 482 and password 483 can specify the user account that the user would like the pre-installed application to be associated with. Password assistance 484 can be selected by a user requires assistance with the password. Once the desired user account has been entered and the correct password has been entered, the user can begin the adoption process by selecting sign in 489. If the user does not have a user account or the user wishes to associate the pre-installed applications with a new account, the user can select account creation 487. If the user wishes to cancel and not update the application(s), the user can select cancel 488. If the user instead desires a more detailed description on any elements described above, the user can select help link 486.

Returning to FIG. 4, the client can receive user authorization to adopt the application (419). This user authorization can be received by the user entering a user account and password into a prompt presented by the client as described in FIG. 7. Once the user authorization has been received by the client, the client can continue to the adoption of the application (421). An exemplary process of adopting an application to a user account is described below in FIG. 12. In some examples, all pre-installed applications must be associated with a user account at the same time. Thus, a user cannot selectively link one pre-installed application associated with an electronic device with one user account and selectively link another pre-installed application associated with the electronic device with another user account. Adopting all pre-installed applications on an electronic device simultaneously can simplify computation overhead in managing the adoption process since the unique hardware identifier associated with an electronic device may be sufficient to notify the server that pre-installed applications have been adopted. In other examples, pre-installed applications on the electronic device can be selectively associated with multiple accounts. Thus, a first pre-installed application can be associated with a first electronic device while a second pre-installed application can be associated with a second electronic device. Management of the pre-installed applications on the server however can require storing the unique hardware identifier of the electronic devices plus the pre-installed applications that have been adopted.

Figure 8:
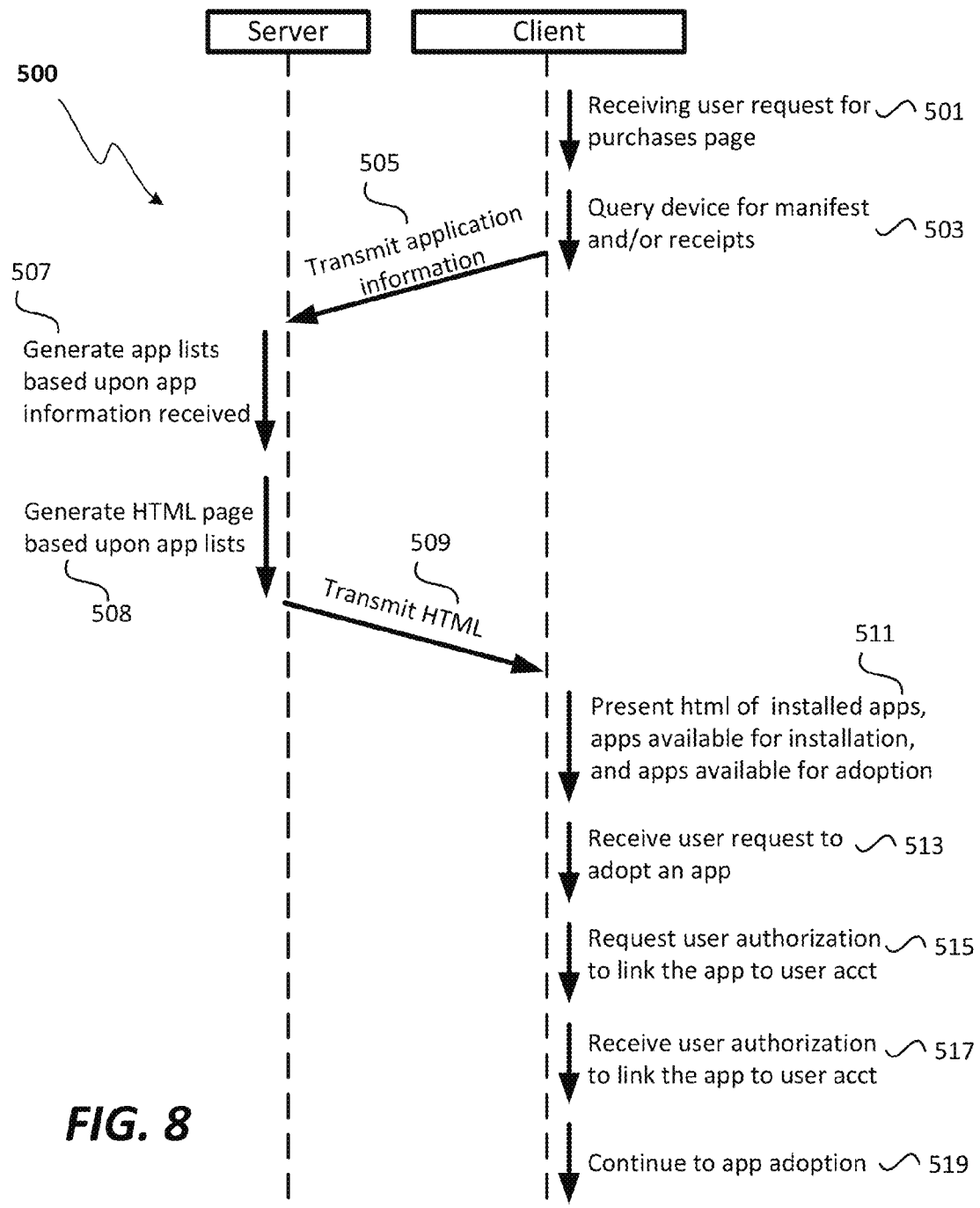
FIG. 8 illustrates an exemplary method for processing a purchases page request.

FIG. 8 illustrates an exemplary method for processing a purchases page request. Method 500, which illustrates actions performed by a client and a server, can be configured to manage the communications between the client and the server during a purchases page request. The actions performed by the server can be executed by a distribution program stored on the distribution center or other component located on the server side while the actions performed by the client can be executed by an applications management program stored on an electronic device of the client side. In some examples, the distribution program stored on distribution center and the applications management program stored on the electronic device can be configured to also perform method 400 of FIG. 4 during an updates page request. Method 500 can begin with a user selecting a purchase tab link in a graphics user interface supplied by a client device. An exemplary purchases tab link can be link 551 in FIG. 9. Once the client has received a user request for purchases page (501), the client can perform a search or query for a manifest and/or receipts (503). In some examples, the manifest can be similar or substantially similar to manifest 340 of FIG. 3. The search or query can be performed by one or more programs or functions available on the client. The application information, which may include the manifest, receipts (real and stub), user account information, and others, can be transmitted to the server (505). The application information is transmitted to server 505 for the purpose of generating a purchases page that informs the user of applications that have been installed, applications available for installation, and applications that can be adopted. The application information that is transmitted can depend on whether the user has signed in on the client. For example, the user account information is accessible and can be transmitted as part of the application information if the user is signed in on the client. As discussed above, the user account information can include information relating to applications associated with the user account. Similarly, receipts can contain information relating to applications associated with the electronic device that the client is running on. The manifest can include information of applications that were originally pre-installed on the electronic device. These are only exemplary types of application information as other types of application information can also be transmitted to the server for generating a purchases page.

The server receives the transmitted application information (i.e., manifest, receipts, user account, and other user account information) and generates one or more lists of applications based upon the received information (507). The applications lists and the process used to generate the applications lists can vary depending upon the information received. A first applications list can include applications that are installed on the electronic device of the client. A second applications list can include applications that are associated with the user account and can be installed on the electronic device of the client. A third applications list can include applications that were pre-installed on the electronic device of the client and can possibly be linked with a user account. Other application lists can also be generated. Depending upon the application information received by the server, one or more of the application lists described above can be generated. In some examples, the generation of the applications lists can involve accessing an applications database such as applications database 220 in FIG. 2. The server can generate an HTML page based upon the generated applications lists (508). The generation of the HTML page can include accessing an applications database to receive metadata associated with applications in the applications lists. For example, the metadata can include the name of the application, a description of the application, a version number of the application, a purchase data of the application, an image associated with the application, and others. Once the HTML page is generated, the server transmits the HTML page to the client (509). The client subsequently presents the HTML page to the user (511). Depending upon whether the user has signed in on the client, different information is presented to the user.

Figure 9:
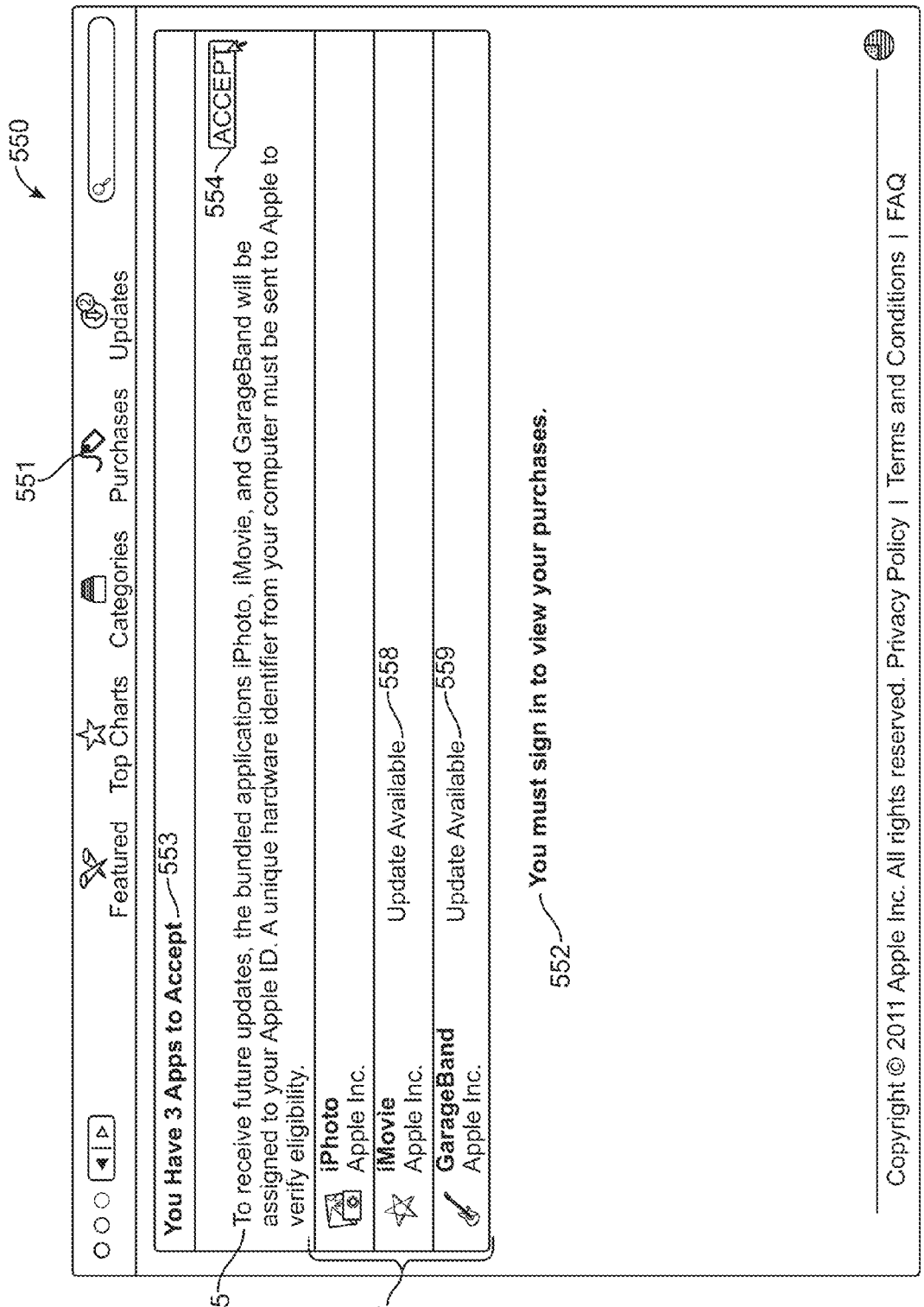

FIG. 9 illustrates an example of an HTML page associated with a purchases page request when the user is not signed in. In this example, HTML page 550 presents the user with a list of applications 557 that are available for adoption. Of the three applications available for adoption, the applications "iMovie" and "GarageBand" have an update available as illustrated by text 558 and 559, respectively. HTML page 550 includes purchases link 551. In some examples, purchases link 551 can function the same or substantially the same as updates link 451 of FIG. 5. HTML page 550 further includes headline 553 that informs the user of the number of applications that are available for adoption. Description 555 provides the user an explanation of the adoption process in hopes of assisting the user in determining whether or not he wishes to adopt the application. HTML page 550 also includes instructions 552 to inform the user that the user must sign in to his user account to receive information about the purchases that are associated with his user account. In this example, HTML page 550 includes one accept link 554 that when selected by the user, initiates the adoption process. In other examples, HTML page 550 can include an accept link for each application available for adoption, thus allowing the user to elect to accept a single application available for adoption, multiple applications available for adoption, or all applications available for adoption. The user can select accept link 554 through a touch screen, a mouse click, a keyboard, or other user input devices.

FIG. 10 illustrates another example of an HTML page associated with a purchases page request when the user is signed in. HTML page 560 presents two application lists to the user. In this example, the presentation of application list 562 includes applications that are available for adoption while the presentation of application list 464 includes applications that have been previously purchased. The two application lists are presented in independent and separate portions of HTML page 560. The presentation of application list 564 includes metadata associated with the previously-purchased applications such as the name of the application, an image associated with the application, the software vendor, the purchase date, and status 566. Status 566 can be configured to display the present state of the purchased application. For example, status 566 can be in an "installed state" when the application is presently installed in the electronic device of the client. Status 566 can be configured to display the text "INSTALLED" when in this state. In this example, the four purchased applications are all installed in the electronic device of the client. As another example, status 566 can be in an "install state" when the application is purchased but not installed in the electronic device of the client. For example, the application may have not been downloaded to this device yet or the application may have been selectively deleted from the device. Status 566 can be configured to display the text "INSTALL" when in this state. Moreover, status 566 can include a user-selectable link when in the "install state." Selecting the user-selectable link results in the application being downloaded to the electronic device and installed.

Returning to FIG. 8, the client can receive user input as a request to adopt an application (513). In some examples, the user input can be selecting accept link 554 of FIG. 9. The client can request user authorization to link the application to a user account (515). An example of an HTML page containing an authorization prompt for requesting user authorization to link the application to a user account is illustrated in FIG. 11.

Figure 11:
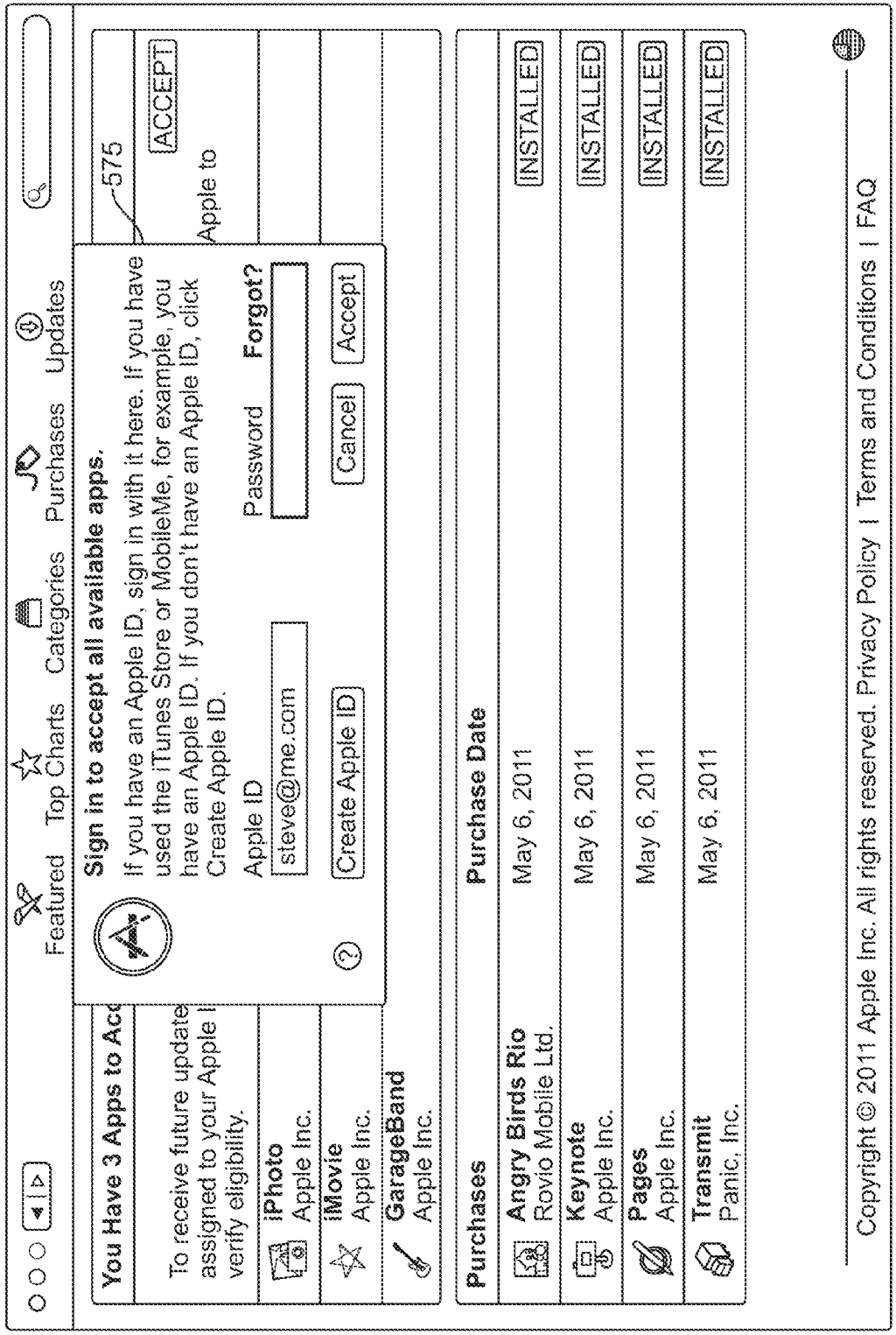
FIG. 11 illustrates another example of an HTML page associated with a purchases page request that includes an authorization prompt.

FIG. 11 illustrates another example of an HTML page associated with a purchases page request that includes an authorization prompt. HTML page 570 can include authorization prompt 575 when the user selects to accept the adoption of pre-installed applications. Authorization prompt 575 can be included as part of a transmitted HTML page from the server and presented to the user after the user selects to accept the adoption of the pre-installed applications. In some examples, authorization prompt 575 can be the same or substantially similar as authorization prompt 480 of FIG. 7.

Returning to FIG. 8, the client can receive user authorization to link the application to a user account. The user account is the user account that is entered during user authorization. For example, the user can enter a username and password of the user account that the application is to be associated to. After user authorization is received by the client, the client can continue to the adoption of the application (519). An exemplary process of adopting an application to a user account is described below in FIG. 12. In some examples, all pre-installed applications must be associated with a user account at the same time. Thus, a user cannot selectively link one pre-installed application associated with an electronic device with one user account and selectively link another pre-installed application associated with the electronic device with another user account. Adopting all pre-installed applications on an electronic device simultaneously can simplify computational overhead in managing the adoption process since the unique hardware identifier associated with an electronic device can be sufficient to notify the server that pre-installed applications have been adopted. In other examples where pre-installed applications on the electronic device can be selectively associated with multiple accounts, management of the pre-installed applications on the server can require storing the pre-installed applications that have been adopted in addition to the unique hardware identifier of the electronic devices.

Figure 12:
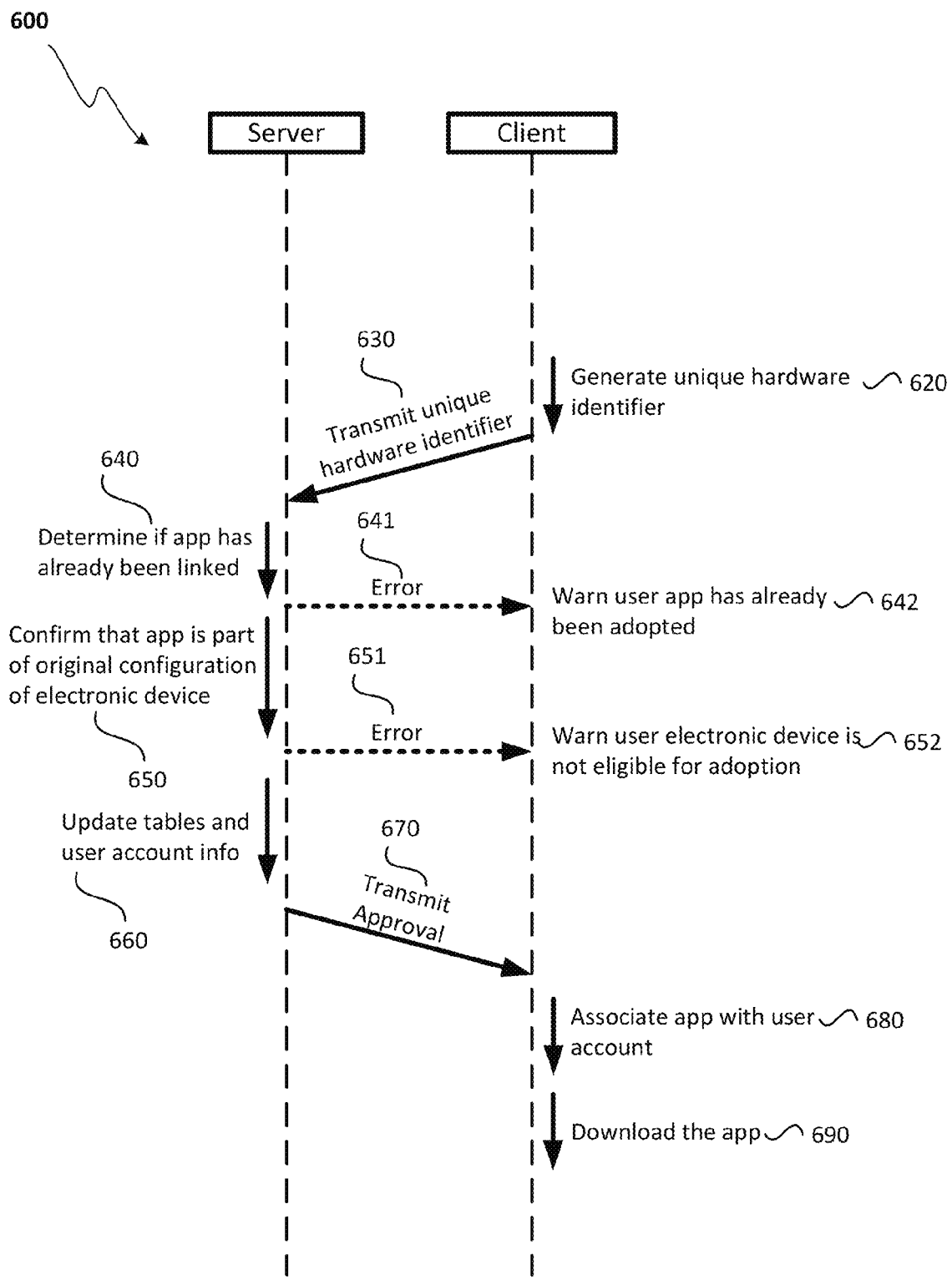
FIG. 12 illustrates an exemplary method for linking a pre-installed application to a user account.

FIG. 12 illustrates an exemplary method for linking a pre-installed application to a user account. Method 600, which illustrates actions performed by a client and a server, can be configured to manage the process of linking a pre-installed application to a user account. The actions performed by the server can be executed by a program on the distribution center or other component on the server side while the actions performed by the client can be executed by an applications management program stored on an electronic device of the client. The applications management program can be configured to install, delete, maintain, or otherwise manage software applications stored on the client. In some examples, the distribution program stored on the distribution center and the applications management program stored on the electronic device can be configured to also perform method 400 of FIG. 4 and/or method 500 of FIG. 5. In some examples, method 600 can be performed after continue to application adoption (421) of FIG. 4 or continue to application adoption (519) of FIG. 5.

Method 600 can generate a unique hardware identifier (620). The unique hardware identifier can be generated from combining one or more identifiers specific to the electronic device. For instance, the unique hardware identifier can be based upon one or more identifiers associated with the hardware components of the electronic device. Since the identifiers of the hardware components are unique, no two unique hardware identifiers are the same. As an example, the unique hardware identifier can be generated by combining the logic board serial number of the device with the Ethernet hardware address of the device. The logic board serial number and the Ethernet hardware address can be combined using concatenation, hashing, an encoding scheme, or other data manipulation algorithm. The unique hardware identifier can be transmitted from the client to the server as part of a request to associate a pre-installed application with a user account (630). In other examples where the pre-installed applications can be selectively adopted, metadata associated with the pre-installed application is also transmitted from the client to the server. The metadata provides details to the server allowing the server to identify the selected pre-installed application which the user is attempting to adopt into the user account. After the server receives the unique hardware identifier and optionally the metadata, the server can determine if the pre-installed application has already been linked with a user account (640). The server can determine whether the application has already been linked by checking the uniqueness table for the unique hardware identifier. Since the uniqueness table stores entries containing the unique hardware identifier of electronic devices that have already adopted pre-installed applications, a unique hardware identifier that is not found in the table signifies that the electronic device has not yet associated any of its pre-installed applications. If method 600 allows for selective adoption of pre-installed applications, then the determination can include querying the uniqueness table for an entry associated with the unique hardware identifier. If the unique hardware identifier is found, the determination can evaluate the entry with the metadata of the pre-installed application to determine if the selected pre-installed application has previously been adopted.

Figure 13:
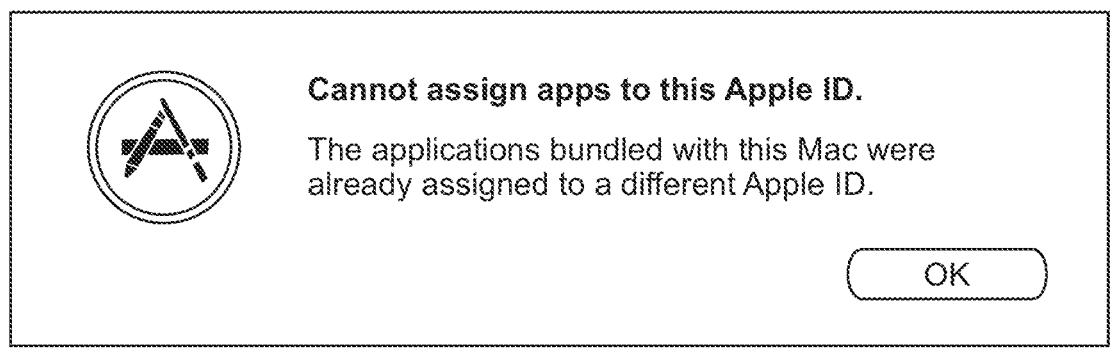
FIG. 13 illustrates an example of an adoption warning.

If it is determined from searching (i.e., querying) the uniqueness table that the application has previously been adopted, then an error is transmitted back to the client (641). The client receives the error and presents a warning to the user that the application has already been adopted (642). FIG. 13 illustrates an example of an adoption warning. Warning 700 notifies the user that the one or more applications that the user wishes to associate with his user account cannot be assigned because the pre-installed applications were already assigned to a different user account. On the other hand, if it is determined from searching the uniqueness table that the application has not been previously adopted, then the server can perform a sanity check to determine whether the pre-installed application is part of the original or default configuration of the electronic device (650). In other words, the server determines whether the electronic device was configured and delivered from the manufacturer with the pre-installed application installed. This sanity check prevents a user from copying a pre-installed application originally installed on one electronic device to another electronic device and attempting to associate the unlawful copy to a user account. The server can query a configurations server with the unique hardware identifier to receive the original configuration of the electronic device associated with the unique hardware identifier. The original configuration can be examined to determine the applications that were pre-installed on the electronic device from the manufacturer. This list of pre-installed applications can be compared with the application the user is attempting to adopt to determine whether that application was pre-installed on the electronic device. In other examples, a copy of the database used to query for original configurations can be stored in the distribution center thus allowing the evaluation of the unique hardware identifier to be performed completely in the distribution center. This can reduce network traffic to the configurations server.

Figure 14:
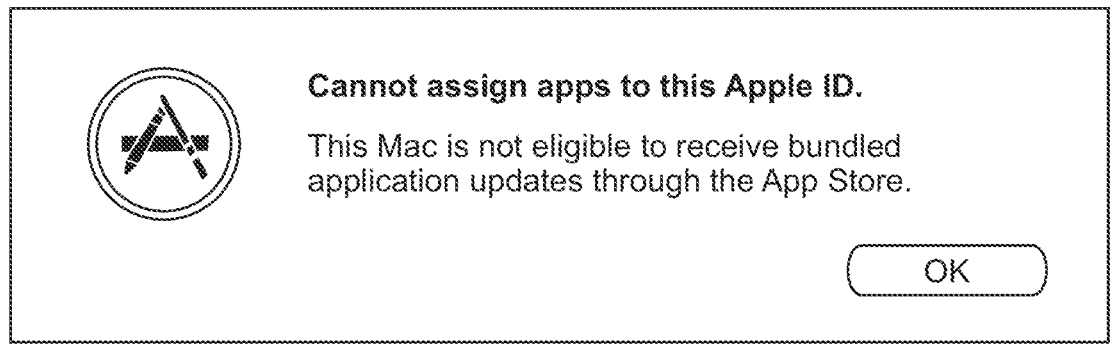
FIG. 14 illustrates another example of an adoption warning.

If it is determined that the application the user wishes to adopt is not part of the original configuration of the electronic device, an error message can be transmitted to the client (651). Once the client receives the error message, the client can present a warning to the user that the electronic device is not eligible for adoption (642). FIG. 14 illustrates another example of an adoption warning. Warning 750 notifies the user that the application cannot be assigned to the user account because the electronic device (herein named "Mac") is not eligible for associating the pre-installed applications with a user account. In other examples, warning 750 can include drawings or other sentences provided for the purpose of informing the user that the electronic device was not originally configured with the pre-installed applications. On the other hand, if it is determined that the application the user wishes to adopt is part of the original configuration of the electronic device, then additional sanity checks, if any, can be performed. Once the server has verified that the pre-installed application can be linked to a user account, the server can update the uniqueness table and the user account stored on the server (660) to indicate that the pre-installed applications of the electronic device have been adopted (and thus cannot be adopted by another user account). As discussed above, a pre-installed application that has been adopted is a pre-installed application of the electronic device that is now associated with the user account and therefore, updates and re-downloads associated with the application can be downloaded to an electronic device associated with the user account. The server can transmit an approval message to the client to inform the client that the request is approved (670).

The approval message informs or notifies the client the pre-installed application is now associated with the user account on the server because the linking request has been evaluated and found to be a genuine request. The client receives the approval message and links the pre-installed application with the user account stored on the client (680). In some examples, the client can also update the manifest stored on the electronic device by removing metadata associated with the pre-installed application that has been linked with the user account from the manifest. Removing metadata associated with the pre-installed application can simplify the adoption process by minimizing checks that are performed to determine whether an application is adoptable. The client can then transmit requests to the distribution center or other components of the server to download the application (690).

FIG. 15 illustrates an exemplary process for recovery mode on an electronic device. Generally, recovery mode can allow an electronic device to resolve internal fatal errors to the operating system by reformatting the storage unit and reinstalling the operating system. Depending upon the specific implementation of the recovery mode, the operating system being reinstalled can vary. As an example, the reinstalled operating system can be the operating system that originally was installed on the electronic device. As another example, the reinstalled operating system can be an updated version of the originally installed operating system. In yet other examples, the newest available operating system from the manufacturer can be reinstalled. Generally, recovery mode only reinstalls the operating system without reinstalling the pre-installed applications. For this reason, pre-installed applications that have not been associated or linked with a user account can be lost. Process 800 solves this problem by retrieving the manifest from the configurations server during recovery mode.

Process 800 can begin by entering recovery mode (820). Entering recover mode can trigger the download of a basic operating system from the manufacturer. The basic operating system can be configured to generate a unique hardware identifier (830). The unique hardware identifier can be generated using one of the methods described above. Once the unique hardware identifier is generated, the basic operating system can transmit the unique hardware identifier to a configurations server (840). Based upon the received unique hardware identifier, the configurations server can return a manifest that includes the applications that were pre-installed on the electronic device and the version number of those applications. In some examples, the communications server may communicate with the distribution server to determine whether the electronic device has already adopted the applications. If the unique hardware identifier is found in the uniqueness table of the distribution center, then one or more of the pre-installed applications of the electronic device has already been adopted. Thus, communications server may return an empty manifest or a manifest that does not include the specific pre-installed applications that have already been adopted. This may minimize the occurrences where a purchases page request presents pre-installed applications to the user for adoption when the pre-installed applications have already been adopted. In other examples where the distribution center stores a local copy of the configurations database, the unique hardware identifier can be transmitted to the distribution center rather than the configurations server. Using the unique hardware identifier, the distribution center can determine the applications that were pre-installed on the electronic device and also the pre-installed applications have already been associated with a user account.

The configurations server (or the distribution center) can return the version number of the operating system that came with the electronic device and a manifest that is based upon the pre-installed applications of the electronic device (850). The version number of the operating system is transmitted to an operating systems server (860), which in turn transmits the original operating system to the electronic device. The electronic device receives the original operating system (870) and optionally, installs the original operating system. The electronic device now includes a fresh copy of the original operating system and a manifest based upon the pre-installed applications of the electronic device. If the user has not associated the pre-installed applications with a user account, the user can do so by selecting the purchases page link as described above.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein can be applied to improve resilience to brute force attacks or similar attacks by limiting the speed at which such attacks are possible. Those skilled in the art will readily recognize various modifications and changes that may be made to the principles described herein without following the example embodiments and applications illustrated and described herein, and without departing from the spirit and scope of the disclosure.

We claim:

1. A computer-implemented method, comprising:
receiving a request from a computing device to download an application to the computing device;
determining that the application is a pre-installed application, wherein a pre-installed application is an application that was installed before acquisition of the computing device by an entity other than the user;
presenting an authorization prompt configured to request user authorization to link the application with a user account;
receiving the user authorization;
in response to receiving the user authorization, determining that the application is linkable based upon a unique hardware identifier associated with the computing device; and
linking the application with the user account when the application is linkable.

2. The method of claim 1, further comprising:
presenting the application available for download according to steps comprising:
receiving a request for an updates page;
in response to receiving the request, collecting a stub receipt associated with the application, the stub receipt including a version number and a name associated with the application;
determining, based upon the version number and the name, that an update of the application is available on a server for download; and
presenting the name of the application.

3. The method of claim 2, wherein determining that the update is available on the server comprises:
searching an applications database for the application; and
comparing the version number of the application with a second version number of a second application stored on the applications database, wherein the second application is the update of the application.

4. The method of claim 2, wherein presenting the application available for download comprises:
receiving a second request for a purchases page;
receiving a manifest associated with the computing device, the manifest including a list of pre-installed applications available for download from the server, the list of pre-installed applications including the application; and
presenting the list of pre-installed applications.

5. The method of claim 1, wherein determining that the application is a pre-installed application comprises determining that the application is associated with a stub receipt, wherein the stub receipt is not associated with any user account or any computing device.

6. The method of claim 1, wherein determining that the application is a pre-installed application comprises:
receiving a manifest associated with the computing device, the manifest including a list of pre-installed applications; and
determining that the application is included within the list of pre-installed applications.

7. The method of claim 1, wherein determining that the pre-installed application is linkable comprises:
transmitting the unique hardware identifier to a server; and
determining whether the pre-installed application has been linked with another user account.

8. The method of claim 1, wherein linking the pre-installed application with the user account comprises:
associating the pre-installed application with the user account, the associating comprising changing information for the user account to indicate that the user account is authorized to perform one or more operations for the pre-installed application; and
updating a uniqueness table to include the unique hardware identifier, the uniqueness table including another unique hardware identifier that is associated with another electronic device having another pre-installed application, the another pre-installed application having been linked with another user account.

9. A non-transitory computer readable storage medium storing instructions which, when executed by a computing device, causes the computing device to perform steps comprising:
receiving communications from a client device, the communications including a user selected option configured to authorize linking a pre-installed application with a user account on an online store and a unique hardware identifier based upon hardware metadata associated with the client device, the online store being configured to transmit application updates and application purchases linked with the user account, wherein a pre-installed application is an application that was installed before acquisition of the computing device by an entity other than the user;
determining that the pre-installed application is linkable based upon the unique hardware identifier;
linking the pre-installed application with the user account when the pre-installed application is linkable; and
transmitting, to the client device, an approval message notifying the client device that the pre-installed application has been linked with the user account.

10. The non-transitory computer readable storage medium of claim 9, further comprising:
receiving, from the client device, a request to link the pre-installed application with the user account, the request including metadata associated with the application pre-installed on a computing device;
generating, based upon the metadata, a web page configured to present user-selectable options associated with the application; and
transmitting the web page to the client device.

11. The non-transitory computer readable storage medium of claim 10, wherein the metadata includes a stub receipt associated with the pre-installed application.

12. The non-transitory computer readable storage medium of claim 10, wherein the metadata includes a manifest associated with the pre-installed application.

13. The non-transitory computer readable storage medium of claim 10, wherein the web page presents a user-selectable option to link the application to the user account.

14. The non-transitory computer readable storage medium of claim 10, wherein the web page presents a user-selectable option to update the pre-installed application.

15. The non-transitory computer readable storage medium of claim 9, wherein determining that the pre-installed application is linkable comprises querying a uniqueness table for the unique hardware identifier to determine whether the pre-installed application has been linked with another user account.

16. The non-transitory computer readable storage medium of claim 9, wherein determining that the pre-installed application is linkable comprises querying a configurations database to determine whether an original configuration of the computing device included the pre-installed application.

17. The non-transitory computer readable storage medium of claim 9, wherein linking the pre-installed application with the user account comprises:
 associating the pre-installed application with the user account; and
 updating a uniqueness table to include the unique hardware identifier, the uniqueness table including another unique hardware identifier that is associated with another electronic device having another pre-installed application, the another pre-installed application having been linked with another user account.

18. A computer-implemented method, comprising:
 receiving a user request to link a pre-installed application with a user account on an online store, the online store configured to transmit applications associated with the user account to at least one computing device associated with the user account, wherein a pre-installed application is an application that was installed before acquisition of the computing device by an entity other than the user;
 determining that the pre-installed application is linkable based upon a unique hardware identifier associated with a computing device; and
 linking the pre-installed application with the user account when the pre-installed application is linkable.

19. The method of claim 18, wherein the unique hardware identifier is based upon one or more hardware components of the electronic device.

20. The method of claim 18, wherein the unique hardware identifier is based upon a logic board serial number and an Ethernet hardware address.

21. The method of claim 18, wherein determining that the pre-installed application is linkable comprises:
 transmitting the unique hardware identifier to a server; and
 receiving from the server a determination of whether the pre-installed application has been linked with another user account.

22. The method of claim 18, wherein determining that the pre-installed application is linkable comprises:
 transmitting the unique hardware identifier to a server; and
 receiving from the server a determination that an original configuration of the computing device includes the pre-installed application.

23. The method of claim 18, wherein linking the pre-installed application with the user account comprises:
 associating the pre-installed application with the user account; and
 removing metadata associated with the pre-installed application from a manifest stored on the client device, the manifest being configured to list pre-installed applications that have yet to be linked.

24. A system, comprising:
 a server that includes a processor and a memory, the server further including:
  a uniqueness table configured to store unique hardware identifiers associated with electronic devices that have adopted one or more pre-installed applications,
  an applications database storing applications and application updates available for distribution by the server, and
  a configurations database storing an original configuration of a client device, the original configuration including a list of pre-installed applications on the client device; and
 a communications network coupling the server with the client device including a user account, an application pre-installed on the client device, and a unique hardware identifier based upon one or more identifiers associated with hardware components of the client device, wherein the client device is configured transmit a request to adopt the application, the request including the unique hardware identifier, and
 wherein the server is configured to process the request, the process including querying the uniqueness table for the unique hardware identifier to determine whether the client device has already adopted the application and querying the configurations database for the unique hardware identifier to determine whether the original configuration of the client device includes the application.

25. The system of claim 24, wherein the server is further configured to:
 receive, with the request, a stub receipt for the pre-installed application, wherein the stub receipt is not associated with any user account or any computing device; and
 determine whether the client device has already adopted the application based at least in part on the stub receipt.

26. The system of claim 24, wherein determining that the application is a pre-installed application comprises:
 receiving a manifest associated with the computing device, the manifest including a list of pre-installed applications; and
 determining that the application is included within the list of pre-installed applications.

27. The system of claim 24, wherein the server is further configured to link the pre-installed application with the user account, wherein the linking comprises:
 associating the pre-installed application with the user account, the associating comprising changing information for the user account to indicate that the user account is authorized to perform one or more operations for the pre-installed application; and
 updating the uniqueness table to include the unique hardware identifier for the pre-installed application.

28. The method of claim 8, wherein the user account is not authorized to perform the one or more operations for the pre-installed application before associating the pre-installed application with the user account.

* * * * *